(12) United States Patent
Akimoto

(10) Patent No.: US 7,693,008 B2
(45) Date of Patent: Apr. 6, 2010

(54) VIDEO REPRODUCTION APPARATUS, VIDEO REPRODUCTION METHOD, AND VIDEO REPRODUCTION PROCESS PROGRAM

(75) Inventor: Satoshi Akimoto, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 12/242,496

(22) Filed: Sep. 30, 2008

(65) Prior Publication Data

US 2009/0110371 A1 Apr. 30, 2009

(30) Foreign Application Priority Data

Oct. 31, 2007 (JP) ............... 2007-284096

(51) Int. Cl.
*H04N 5/91* (2006.01)
(52) U.S. Cl. ............ 368/68; 368/111; 368/112; 368/125
(58) Field of Classification Search ............ 386/46, 386/68, 74, 111, 112, 125
See application file for complete search history.

(56) References Cited

U.S. PATENT DOCUMENTS 6,658,199 B1 * 12/2003 Hallberg ............... 386/68
7,010,219 B2 * 3/2006 Nakagawa ............. 386/111

2003/0099293 A1 5/2003 Okada et al.
2006/0291807 A1 12/2006 Ryu et al.

FOREIGN PATENT DOCUMENTS

| JP | 9-327020 | 12/1997 |
|---|---|---|
| JP | 2003-224827 | 8/2003 |
| JP | 2003-244641 | 8/2003 |
| JP | 2006-303652 | 11/2006 |
| JP | 2006-325086 | 11/2006 |
| JP | 2007-36495 | 2/2007 |
| JP | 2007-158901 | 6/2007 |
| WO | WO 99/57724 | 11/1999 |

OTHER PUBLICATIONS

Japanese Patent Application No. 2007-284096 Office Action mailed Dec. 11, 2008 (English translation).

* cited by examiner

*Primary Examiner*—Huy T Nguyen
(74) *Attorney, Agent, or Firm*—Blakely Sokoloff Taylor & Zafman, LLP

(57) ABSTRACT

According to one embodiment, for each GOP, frames from an I frame present at a leading position of GOP to an I frame contained in a succeeding GOP and B frames referencing the I frame contained in the succeeding GOP are managed as a new GOP. For each new GOP, video frames from a leading I frame to a last I frame are subjected to a decoding process in order of increasing PTS value. For each new GOP with the last I frame of the video frames discarded, the video frames are subjected to video display in order of decreasing PTS value.

9 Claims, 10 Drawing Sheets

```
typedef struct{
        ppe_uint32    PTS;      // PTS
        ppe_uint32    offset;   // GOP start file offset of one frame constituting GOP
        ppe_uint32    noffset;  // GOP end file offset of one frame constituting GOP
        ppe_uint32    RFU;      // RFU
} index_t;
```

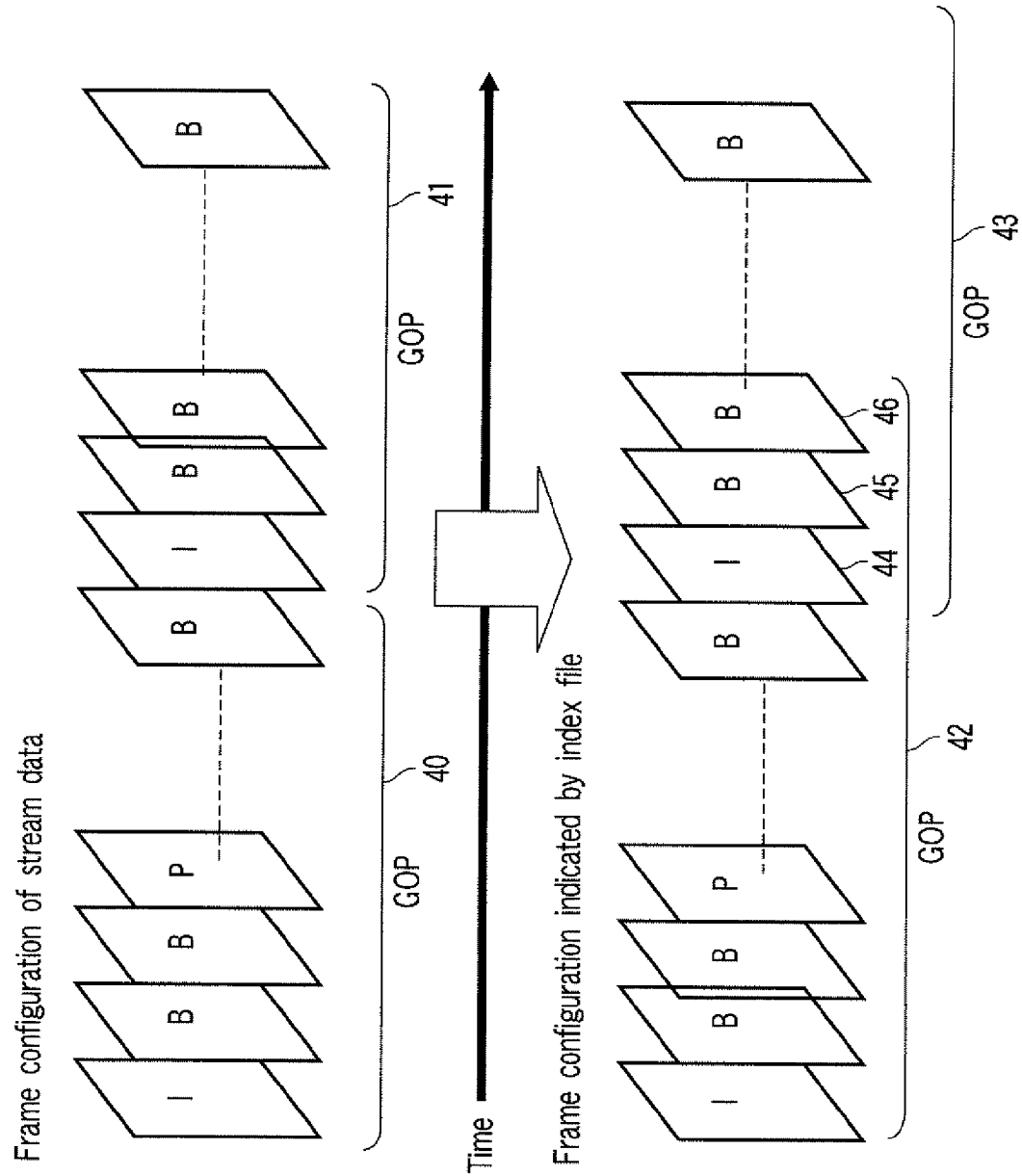
F I G. 4

VIDEO REPRODUCTION APPARATUS, VIDEO REPRODUCTION METHOD, AND VIDEO REPRODUCTION PROCESS PROGRAM

CROSS-REFERENCE TO RELATED APPLICATIONS

This application is based upon and claims the benefit of priority from Japanese Patent Application No. 2007-284096, filed Oct. 31, 2007, the entire contents of which are incorporated herein by reference.

BACKGROUND

1. Field

One embodiment of the invention relates to a video reproduction apparatus, a video reproduction method, and a video reproduction process program which are used to reproduce digital video signals subjected to a efficient compression coding process using an inter-frame prediction coding technique, from an information recording medium, and in particular, to improvements in a video reproduction apparatus, a video reproduction method, and a video reproduction process program which perform forward and reverse variable-speed reproductions.

2. Description of the Related Art

As is well-known, efforts have been made to reduce the amount of information in video signals to be digitally recorded on an information recording medium, for example, a hard disk, by subjecting the video signals to an efficient compression coding process. As an efficient compression coding process of this kind, the Moving Picture Experts Group (MPEG) scheme is currently commonly adopted.

The MPEG scheme specifies three types of video frames: intra (I) frames, predictive (P) frames, and bidirectionally predictive (B) frames. Of the three types of frames, the I frames correspond to intra-frame coded videos coded using only intra-frame information. Video signals for one frame can be restored using only the I frames.

The P frames correspond to inter-frame forward prediction coded videos predicted on the basis of past frames. The P frames may involve inter-frame reverse prediction coding that predicts videos on the basis of future frames. The B frames correspond to inter-frame bidirectional prediction coded videos predicted on the basis of both past and future frames.

The MPEG scheme records and reproduces video signals on and from the information recording medium in group-of-picture (GOP) units; a GOP contains the three types of frames having respective predetermined numbers of frames. This enables random accesses to allow performance of various special reproduction operations such as reproduction from any position, forward and reverse variable-speed reproductions, and still reproduction.

Among the special reproduction operations, the forward and reverse variable-speed reproductions are generally achieved by searching for the I frames present in GOP read from the information recording medium, subjecting the I frames to a decoding process, and displaying the decoded video frames forward or in reverse along a time sequence.

However, one GOP is ordinarily often composed of 15 frames, one I frame, four P frames, and 10 B frames and thus contains an amount of information corresponding to a video display time of about 0.5 seconds. Thus, the simple technique of decoding and displaying only the I frames in each GOP fails to display videos with smooth motions particularly during the reverse variable-speed reproduction.

Jpn. Pat. Appln. KOKAI Publication No. 2003-244641 discloses a technique of enabling smooth reverse reproduction by, during forward data reproduction, storing stream data obtained by decoding coded data, in a buffer area, and during reverse data reproduction, reading the decoded stream data stored in the buffer area for display.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is a diagram illustrating COPs handled by an index file in the video reproduction apparatus according to the embodiment;

DETAILED DESCRIPTION

Various embodiments according to the invention will be described hereinafter with reference to the accompanying drawings. In general, according to one embodiment of the invention, for each GOP, frames from an I frame present at a leading position of GOP to an I frame contained in a succeeding GOP and B frames referencing the I frame contained in the succeeding GOP are managed as a new GOP. For each new GOP, video frames from a leading I frame to a last I frame are subjected to a decoding process in order of increasing PTS value. For each new GOP with the last I frame of the video frames discarded, the video frames are subjected to video display in order of decreasing PTS value.

Figure 1:
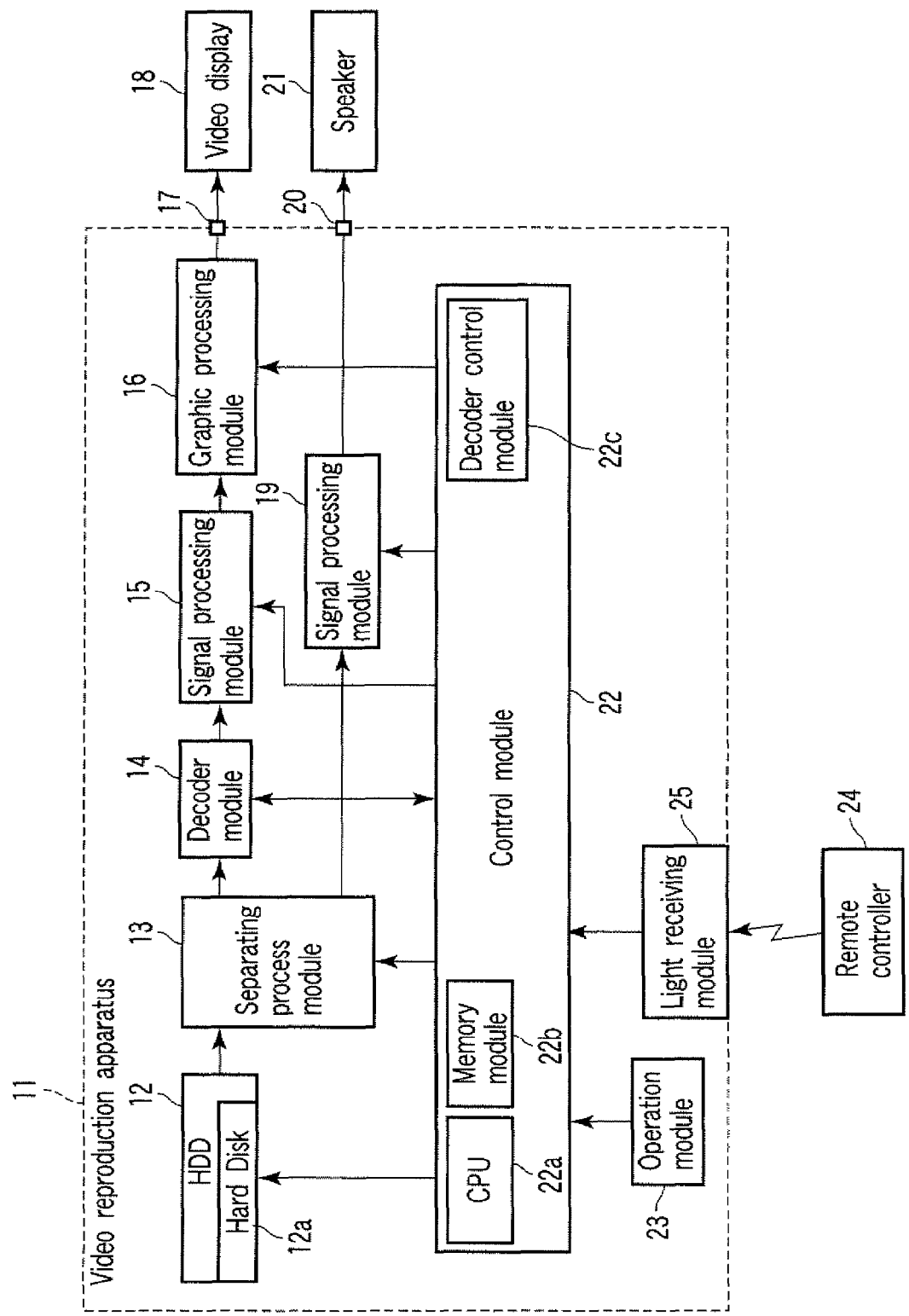
FIG. 1 is a block diagram showing an embodiment of the present invention and schematically illustrating a video reproduction apparatus.

An embodiment of the present invention will be described below in detail with reference to the drawings. FIG. 1 schematically shows a video reproduction apparatus 11 described in the embodiment. That is, HDD (Hard Disk Drive) 12 reads stream data from a hard disk 12a and supplies the data to a separating process module 13, which separates the data into a video signal and an audio signal.

The video signal is supplied to a decoder module 14, which subjects the signal to an MPEG decoding process. The processed signal is supplied to a signal processing module 15, which subjected the signal to a predetermined digital signal process. The video signal is output by the signal processing module 15 and then supplied to a graphic processing module 16, which superimposes a predetermined OS (On Screen Display) signal on the video signal. The resulting signal is then supplied to an external video display 18 via a video output terminal 17.

The audio signal resulting from the separation by the separating process module 13 is supplied to a signal processing module 19, which subjects the signal to a predetermined digital signal process. The audio signal is then output by the signal processing module 19 and output to an external speaker 21 via an audio output terminal 20 for audio reproduction.

Here, all operations of the video reproduction apparatus 11 including the above-described reproduction operation are integrally controlled by a control module 22. The control module 22 has a built-in central processing unit (CPU) 22a. The control module 22 receives operation information obtained from an operation module 23 installed in the main body of the vide reproduction apparatus 11 or operation information transmitted by a remote controller 24 and received by a light receiving module 25 to control appropriate modules so that the control reflects the contents of the operations.

In this case, the control module 22 mainly utilizes a memory module 22b. The memory module 22b has a read-only memory (ROM) that stores control programs to be executed by the CPU 22a, random access memory (RAM) that provides work areas for the CPU 22a, and a nonvolatile memory that stores various pieces of setting information and control information.

The control module 22 has a decoder control module 22c. The decoder control module 22c has a function of controlling processes of the decoder module 14 so that videos with smooth motions can be displayed when a request is made for forward or reverse variable-speed reproduction of video signals recorded in the hard disk 12a.

That is, when a user requests forward or reverse reproduction, the control module 22 first allows HDD 12 to read an index file from the hard disk 12a to search for GOP containing PTS (Presentation Time Stamp) that is time information on a video specified by the user.

Subsequently, the control module 22 allows HDD 12 to read and store stream data corresponding to GOP containing PTS, in the memory module 22b. The control module 22 allows the stream data stored in the memory module 22b to be transferred to the decoder module 14 in preset size unit.

Then, the control module 22 allows frame data to be periodically read from the decoder module 14 and stored in the memory module 22b in order of increasing PTS value. The control module 22 then manages the frame data in COP unit. Once all the frame data constituting GOP are successfully stored in the memory module 22b, the following process is executed according to the requested reproduction operation.

That is, when forward reproduction is requested, the frame data is read from the memory module 22b in order of increasing PTS value so as to display the corresponding video on the video display 18. When reverse reproduction is requested, the frame data is read from the memory module 22b in order of decreasing PTS value so as to display the corresponding video on the video display 18.

Now, the reason for the creation of the index file will be explained. That is, if the stream data is compression-coded according to MPEG2, achievement of the reverse reproduction requires executing a decoding process in GOP unit and arranging YUV data resulting from the decoding process in order of decreasing PTS value for reproduction.

Thus, the index file is required to allow the stream data to be accessed in GOP unit. The index file is created at the beginning of reproduction and deleted at the end of the process so that a different application can record stream data in the index file. The index file is created by sequentially writing data to the file in order of increasing PTS value using data defined by such a structure as shown in FIG. 2, as one record so that the stream data can be accessed using a PTS value as a key.

Figures 2, 3:
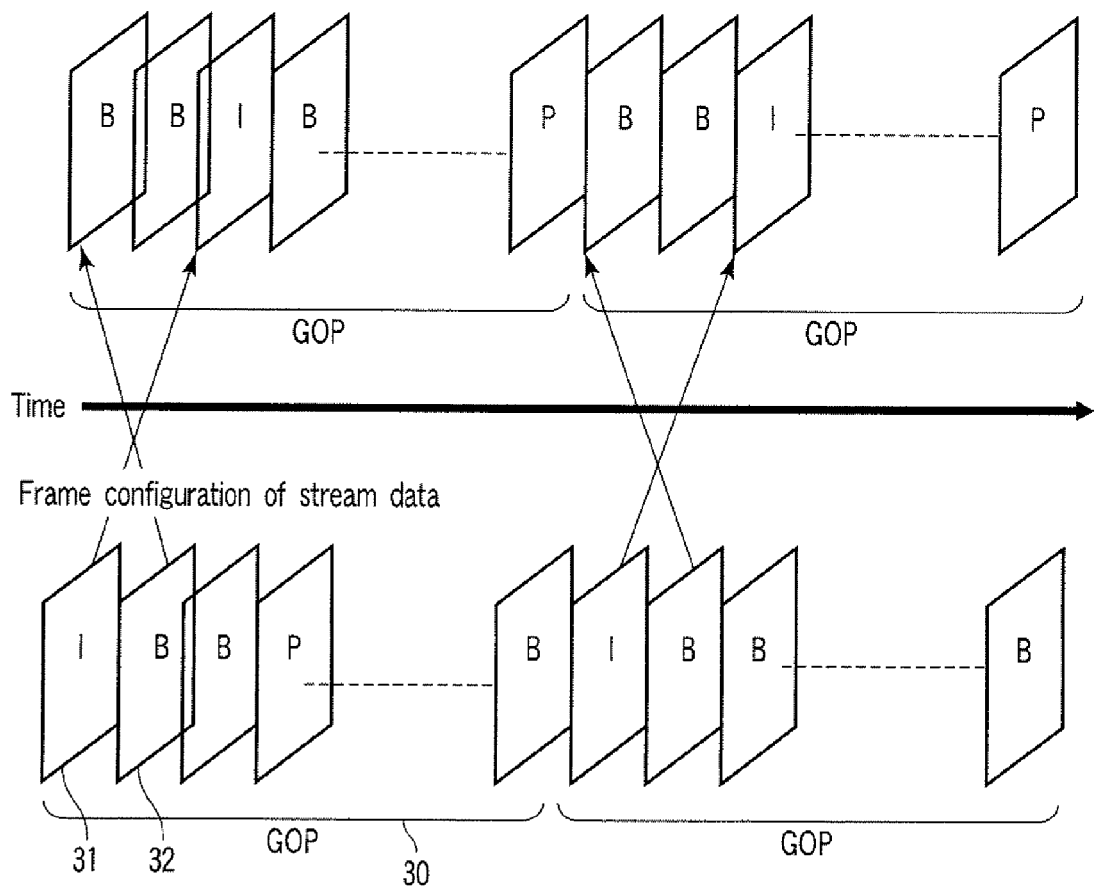
FIG. 2 is a diagram illustrating an index file accessed by the video reproduction apparatus according to the embodiment to read stream data in GOP units.
FIG. 3 is a diagram illustrating a frame configuration resulting from a decoding process in the video reproduction apparatus according to the embodiment.

FIG. 3 shows the relationship between the stream data and the stream data resulting from a decoding process. That is, FIG. 3 shows how the order of frames on stream data is changed by decoding inter-frame prediction coded stream data. After a decoding process, I frames 31 and B frames 32 constituting GOP 30 in the stream data are output by the decoder module 14 in order of the B frames 32 and the I frame 31. Each of the B frames 32 is bidirectional-prediction-coded and thus references frame data in a preceding GOP.

That is, in the example in FIG. 3, the B frames, the second and third frame from the leading position of GOP constituting the stream data, are decoded with reference to data in a P frame in the preceding GOP. Thus, the header at the leading position of GOP cannot be specified as a GOP boundary. The GOP boundary is thus managed unlike in the case of MPEG2 standards so as to allow the B frames to be decoded. Specifically, as shown in FIG. 4, the index file is created such that the current GOP as well as an I frame 44 and B frames 45 and 46 in the next GOP 43 can be managed as one FOP 42.

FIG. 4 illustrates the configuration of GOP determined by the inter-frame prediction coding shown in FIG. 3 and GOP handled by the index file in the present embodiment. GOP on the stream file is configured as shown by GOP 41 and GOP 42. However, in the present embodiment, the index file is created such that the frame configuration resulting from the decoding process can be managed as one GOP.

Thus, the I frame 44 and the B frames 45 and 46 are added to the frame data constituting GOP 42, and the structure obtained is managed as GOP 42. Thus, the I frame 44 and the B frames 45 and 46 are allowed to overlap GOP 43 to create the index file.

During recording, when an MPEG2 encoder detects generation of the P frame as a scene change, the P frame may change to the I frame. In this case, the index file is created such that GOP is divided into a minimum number of frames. Thus, if the scene change changes the P frame to the I frame, the control module determines that the change corresponds to the beginning of GOP, and separates the corresponding part of the data as another GOP unit to create data for one record.

Error checks on the stream file for the creation of the index file are performed only for a pay load size. Furthermore, if a file open error is detected, the process is aborted. If the payload size is zero, the control module determines that this indicates the end of the stream file, and terminates the creation of the index file. Thus, even if any stream data succeeds that frame, that stream data is prevented from being reproduced by the process procedure of transmitting the stream data.

Furthermore, the procedure of transmitting the stream data from the memory module 22b to the decoder module 14 is switched according to the reproduction direction. For forward reproduction, the data is sequentially read from the leading position of the file and transmitted to the decoder module 14. The read position is managed on the basis of offsets in the stream file. If the EOF and payload size of the file are zero, offset management information on the file is initialized so as to read data from the leading position of the file.

For reverse reproduction, the last recorded information is reproduced from the index file. Data is read forward from a GOP start file offset in the recorded data and transmitted to the decoder module 14. If a GOP end file offset in the recorded data matches the offset in the transmitted data after the data transmission, the next record data is read from the index file in order of decreasing offset to read the next GOP. Transmission of the stream data is then repeated.

Data with offset=0 is read from the index file to initialize offset management information. During reverse data transmission, for the B frames corresponding the second and third frames from the leading position of COP and overlapping the decode frames in the preceding GOP, only the file offset is calculated, and data transmission is not performed.

Figure 5:
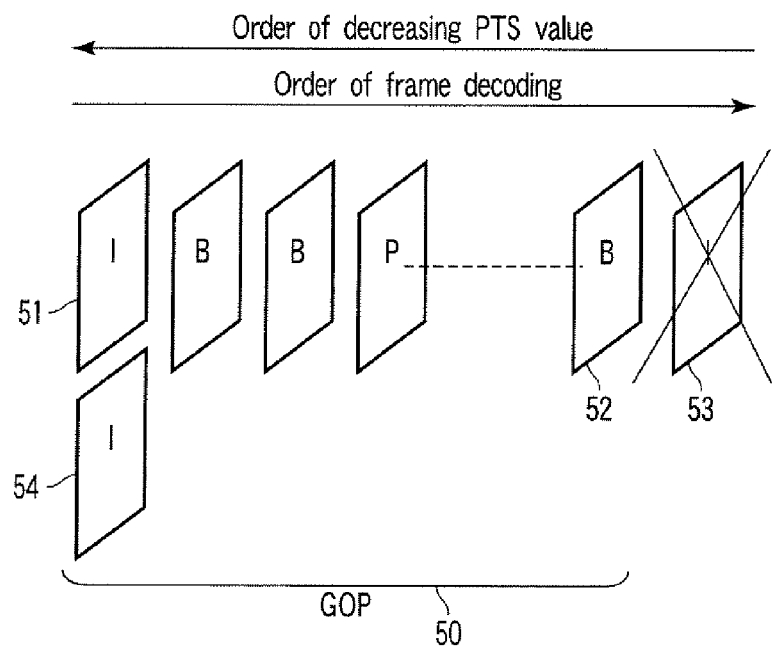
FIG. 5 is a diagram illustrating the order of PTSs in decoded data and the order of transfer of the decoded data, in the video reproduction apparatus according to the embodiment.

FIG. 5 shows the order of PTS in the frame data output by the decoder module 14 and the order of transfer to the video display 18. The inter-frame prediction coded frames cannot be decoded unless the data is decoded in order of increasing PTS value. Thus, the decoding process is started using I frames 51 and 52, which are not subjected to inter-frame prediction coding.

For reverse reproduction, the data is written to the decoder module 14 in order of decreasing GOP unit. The I frame 51, . . . , the B frames 52, and an I frame 53 constituting the GOP, are output by the decoder module 14 in order of increasing PTS value, as shown as the order of frame decoding.

Then, when an I frame 54, the leading frame of GOP, is output by the decoder module 14, the I frame 53, which is duplicately decoded, is discarded. The frames are transferred to the video display module 18 in order of the B frame 52 to the I frame 51 as shown as the order of decreasing PTS value.

Figure 6:
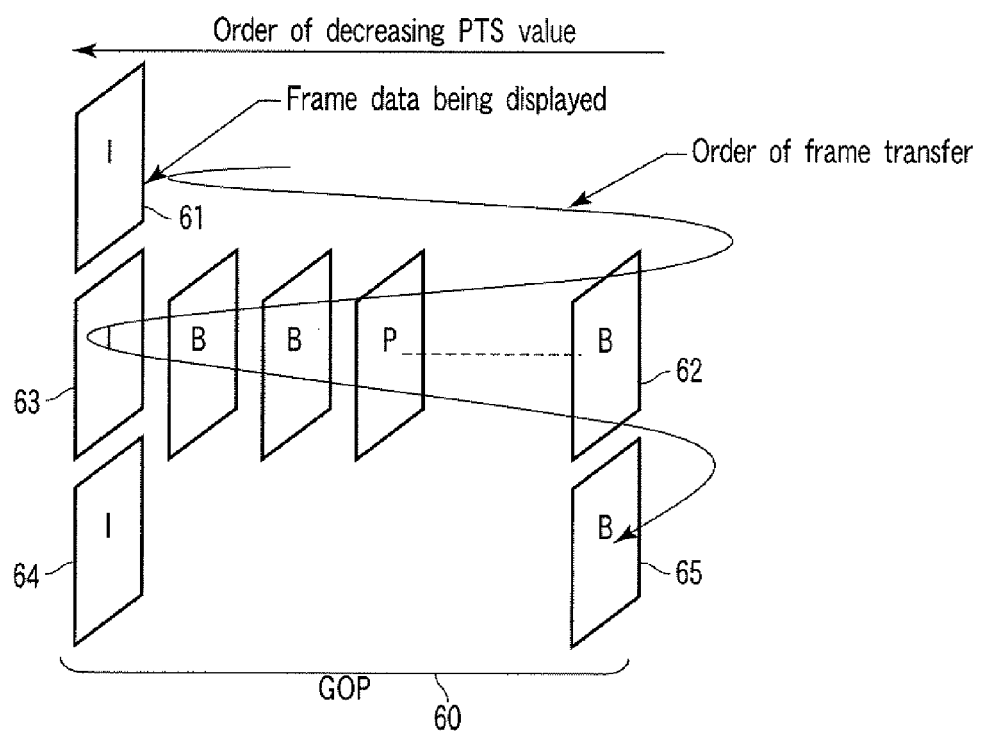
FIG. 6 is a diagram illustrating an operation of determining a GOP boundary for each decoded data and transferring the GOP boundary to a video display, in the video reproduction apparatus according to the embodiment.

FIG. 6 shows that the control module 22 comparatively checks PTS in each frame data output by the decoder module 14 to determine the boundary between GOPs 60 and transfers the data to the video display 18. That is, the control module 22 determines that PTSs in I frames 61, 63, and 64, corresponding to the leading frames of GOPs 60, are in decreasing order to detect the boundary between GOPs. FIG. 6 shows that the I frame 61 output by the decoder module 14 is transferred to the video display 18 and that the decoder module 14 detects the I frame 64, so that the frame data is transferred to the video display 18 in the order indicated by the order of transfer of the frames.

To achieve the reverse reproduction, the frame data output by the decoder module 14 is held in the memory module 22b in GOP unit in order of increasing PTS value. For the reproduction, the frame data is transmitted from the memory module 22b to the signal processing module 15 in GOP unit. The area in the memory module 22b in which the frame data is held is provided on a memory area specified by a framework, during initialization.

The minimum required capacity of the memory module 22b corresponds to the maximum number of frames constituting GOP+2 frames. The 2 frames mean that the boundary between GOPs is detected by managing data on three GOPs. Specifically, the 2 frames are the final frame of GOP being displayed and the first frame of the next GOP, which is required to determine the boundary between GOPs.

To manage the frames, pointers passed by functions provided by the framework are managed. The management is performed using a cue for managing the pointers for the three GOPs and a variable for cue overflow. The process procedures of cuing and decuing are changed depending on the reproduction direction. For forward reproduction, the cue for the three GOPs is managed as one ring buffer. Both tread pointer and the write pointer are controlled in order of increasing PTS value. Underflow is detected when the cue corresponds to two frames.

For reverse reproduction, three buffers are independently managed. The three buffers are managed as independent ring buffers. The areas between the thee buffers are managed as rings in order of decreasing PTS value. One of the buffers manages the write pointer in order of increasing PTS value and manages the read pointer in order of decreasing order. Thus, the three GOPs are managed so as to avoid the competition between read and write for the same GOP.

In the cuing procedure, cuing is performed by determined that PTS is in increasing order in GOP. The boundary between GOPs is determined on the basis of a change of PTS value to the decreasing order. Furthermore, since data is transmitted such that the same frames are decoded at the boundary of GOP, when the boundary of GOP is determined, the I frame decoded at the end of GOP is decued and discarded. The frame to be discarded is not subjected to the determination including PTS. One or two frames are discarded depending on whether or not IP (Interlace Progressive) conversion is performed. Furthermore, all frames that do not meet cuing conditions are discarded.

Process operations in the present embodiment will be described below in detail. When instructed to perform reverse reproduction, the control module 22 reads, via HDD 12, the index file indicating the file offsets in units of the COPs 42 and 43, shown in FIG. 4. The control module 22 then transfers the stream data corresponding to the I frame 44 in GOP 43 to the decoder module 14.

However, upon reading the stream data, the control module 22 avoids transferring the stream data on the B frames 45 and 46, which overlap between GOPs, to the decoder module 14. The frame data output by the decoder module 14 is obtained by decoding the I frames 51 to 53 in the order of frame decoding shown in FIG. 5.

Subsequently, the control module 22 changes the frame data from which the stream data is read in GOP unit in decreasing order to decode the I frame 54. Upon detecting that PTS applied to the I frame 54 is smaller than that applied to the I frame 51, the control module 22 determines that all of GOP 50 has been obtained to discard the I frame 53.

Then, the control module 22 starts transferring the frames to the video display 18 in order of decreasing PTS value starting with the B frame 52, as shown as the order of the transfer of the frames in FIG. 6. Subsequently, as shown in FIG. 6, the control module 22 stores the I frame 63 to B frame 62 in GOP being decoded and the I frame 64 in the memory module 22b.

Subsequently, in response to the decoding of the I frame 64, the boundary between COPs 60, the control module 22 starts transferring the frames to the video display 18 starting with the B frame 62. The control module 22 transfers the frame data stored in the memory module 22b in order of decreasing PTS value, in conjunction with the refresh rate of the video display 18. Subsequently, the above-described procedure is repeated to enable smooth reverse reproduction at x1 speed.

Furthermore, in the present embodiment, the use of the decoder module 14, which can achieve decoding in a length of time shorter than that actually required, enables any high-speed reproduction of at least x1 speed depending on the capability of the decoder. Furthermore, slow-speed reproduction is enabled by reducing the transfer speed.

Moreover, after video display, the frame data is left in units of GOPs 60 so that after the reproduction speed is switched, the frame data can be transferred without the need to wait for the decoding process to complete. Thus, a display timing for the next frame data to be displayed is controlled to enable reproduction to be instantaneously performed after a change in speed or direction or after a halt, according to the user's request.

In the present embodiment, data corresponding to one I frame needs to be duplicately decoded for forward reproduction. This enables high-speed reverse high-speed reproduction that is as smooth as forward reproduction or improves the operability in switching the reproduction direction.

Figure 7:
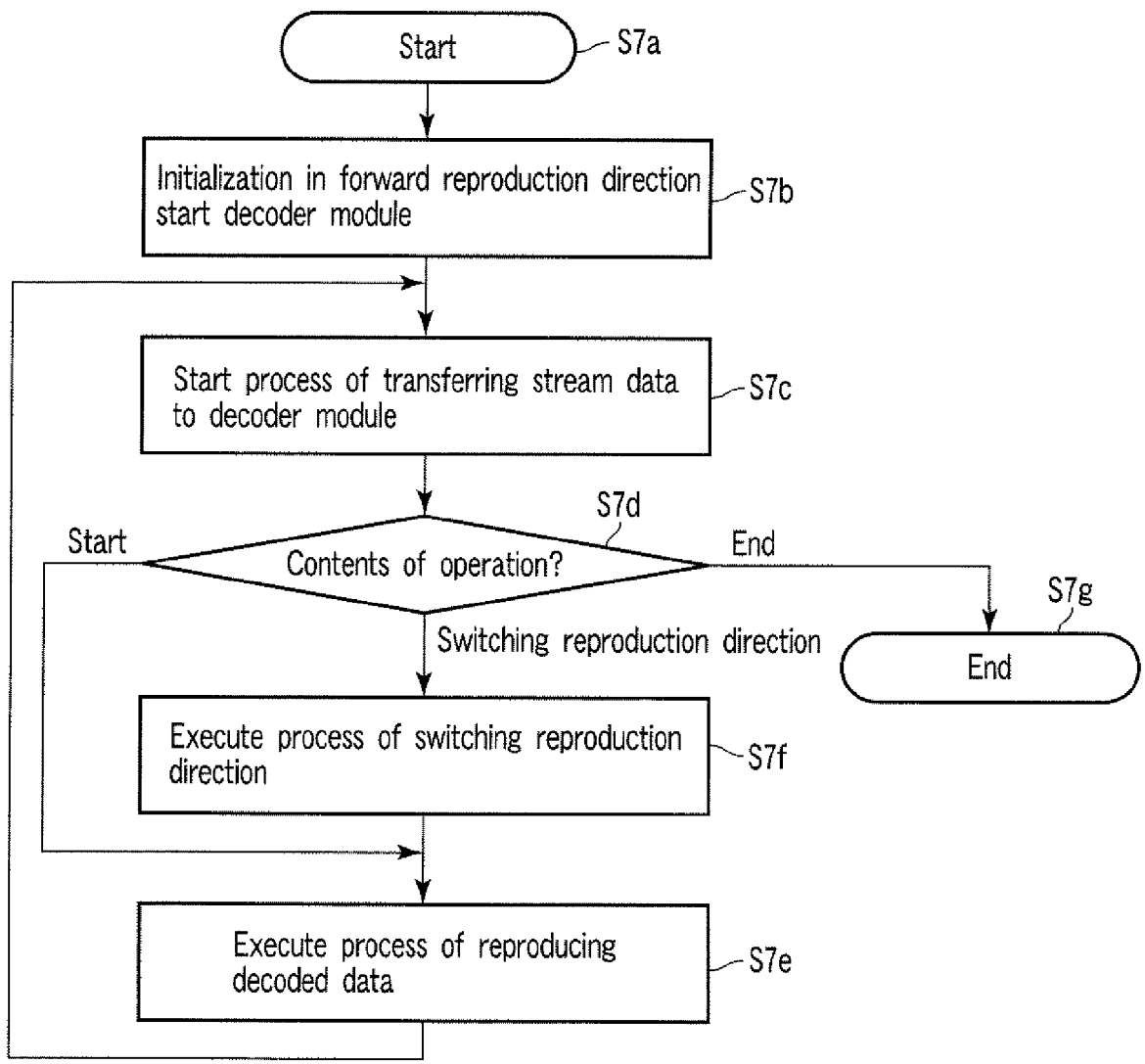
FIG. 7 is a flowchart illustrating a variable-speed reproduction process operation performed by the video reproduction apparatus according to the embodiment.

FIG. 7 is a flowchart generally illustrating the above-described variable-speed reproduction operation. That is, when variable-speed reproduction is requested, the process is started (step S7a). Then, in step S7b, the control module 22 executes an initializing process with the reproduction set in the forward direction, and starts the decoder module 14. In step S7c, the control module 22 starts a process of transferring the stream data to the decoder module 14.

Subsequently, in step S7d, the control module 22 determines the contents of the operation performed for the variable-speed reproduction. Upon determining that a terminating operation has been performed, the control module 22 completes the variable-speed reproduction process (step S7g).

Upon determining in step S7d, described above, that a variable-speed reproduction starting operation has been performed, the control module 22 executes a process of reproducing the decoded data in step S7e. The control module 22 is then shifted to the processing in step S7c. Moreover, upon determining in step S7d, described above, that a reproduction direction switching operation has been performed, the control module 22 executes the reproduction direction switching process in step S7f. The control module 22 is then shifted to the processing in step S7e.

Figure 8:
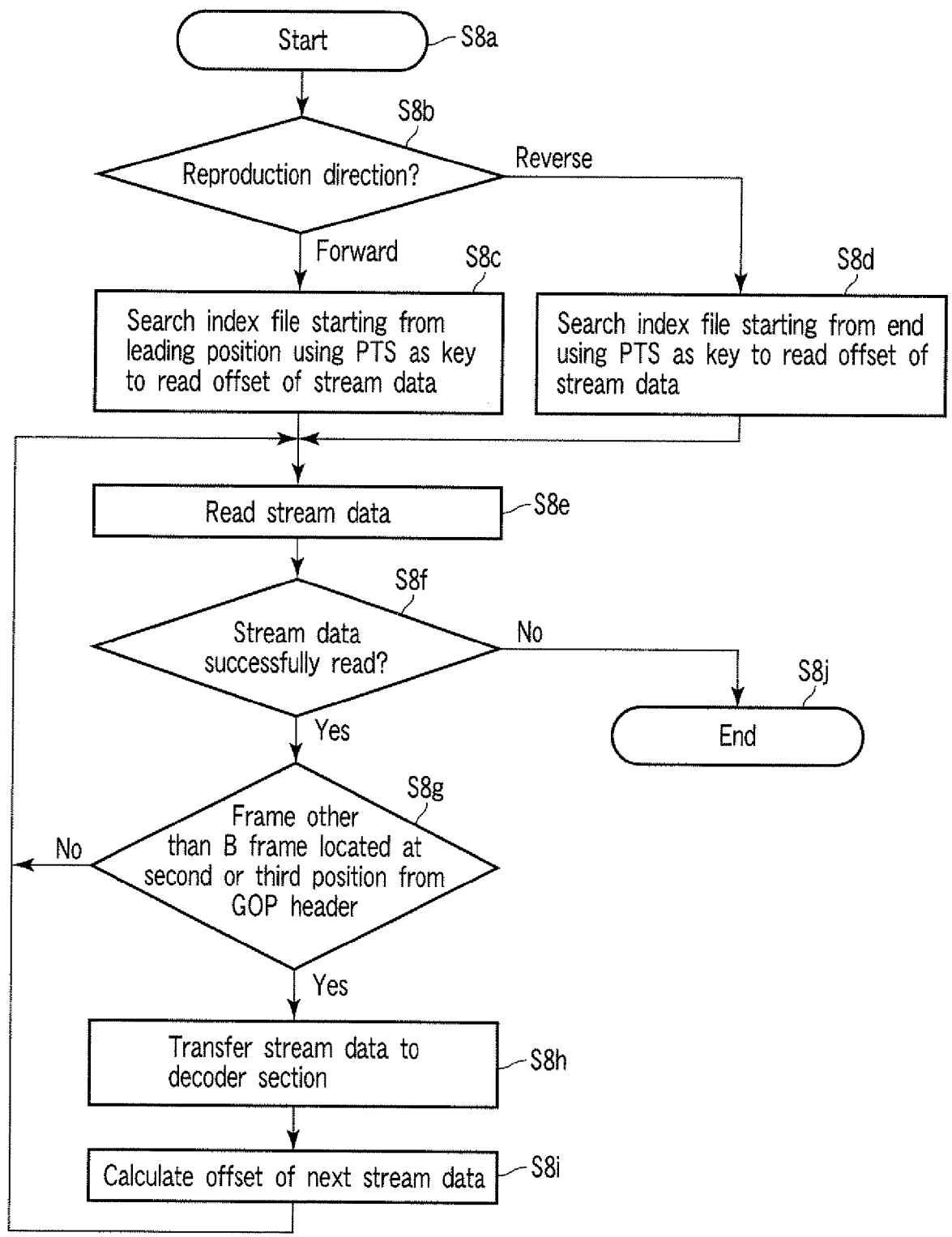
FIG. 8 is a flowchart illustrating a stream data transfer process operation performed by the video reproduction apparatus according to the embodiment.

FIG. 8 is a flowchart generally illustrating an example of the stream data transferring process operation in step S7c, described above. That is, transfer of the stream data is requested, and the process is started (step S8a). Then, in step S8b, the control module 22 determines whether the reproduction direction is forward or in reverse.

Upon determining that the reproduction direction is forward, the control module 22 searches the index file from the leading position using PTS as a key to read the offset of the stream data, in step S8c. Upon determining that the reproduction direction is in reverse, the control module 22 searches the index file from the end of the file using PTS as a key to read the offset of the stream data, in step S8d.

After step S8c or S8d, described above, the control module 22 reads stream data in step S8e and determines in step S8f whether or not the stream data has been successfully read. Upon determining that the stream data cannot be read (NO), the control module 22 completes the stream data transferring process (step S8j)

Upon determining in step S8f, described above, that the stream data has been successfully read (YES), the control module 22 determines in step S8g whether the read stream data is different from the B frame located at the second or third position from the GOP header. Upon determining that the read stream data is the B frame located at the second or third position from the GOP header (NO), the control module 22 is shifted to the processing in step S8e.

On the other hand, upon determining in step S8g that the read stream data is different from the B frame located at the second or third position from the GOP header (YES), the control module 22 transfers the read stream data to the decoder module 14 in step S8h. In step S8i, the control module 22 calculates the offset of the next stream data, and is then shifted to the processing in step S8e.

Figure 9:
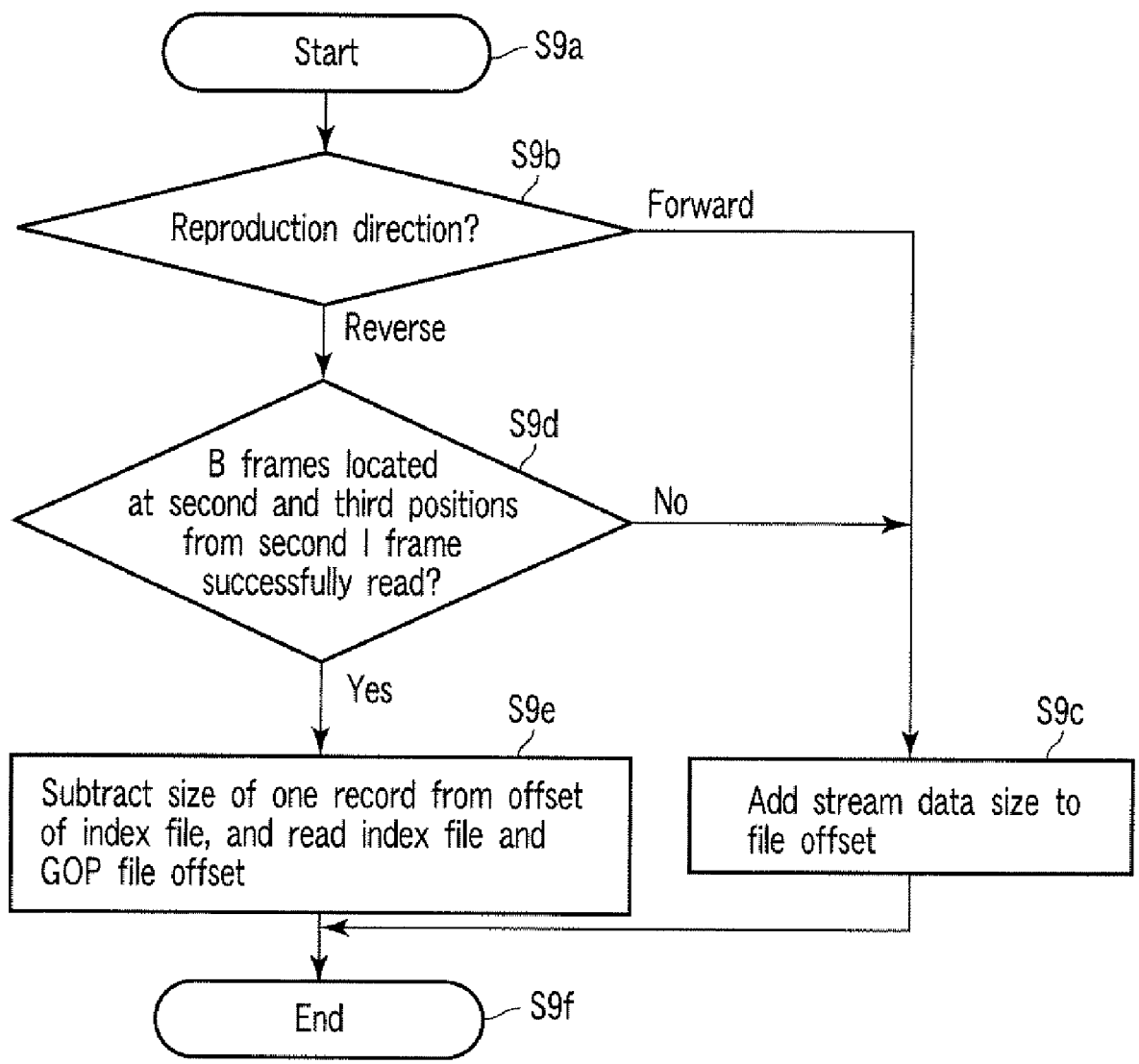
FIG. 9 is a flowchart illustrating a stream data offset calculating process operation performed by the video reproduction apparatus according to the embodiment.

FIG. 9 is a flowchart generally illustrating an example of a process operation of calculating the offset of the next stream data in step S8i, described above. That is, calculation of the offset of the next stream data is requested, and the process is started (step S9a). Then, in step S9b, the control module 22 determines whether the reproduction direction is forward or in reverse.

Upon determining that the reproduction direction is forward, the control module 22 adds the stream data size to the file offset in step S9c. The control module 22 then completes the process of calculating the offset of the next stream data (step S9f).

Upon determining that the reproduction direction is in reverse, the control module determines in step S9d whether or not the B frames located at the second and third position from the second I frame have been read. Upon determining that the B frames have not been read (NO), the control module 22 is shifted to the processing in step S9c.

Upon determining in step S9d, described above, that the B frames located at the second and third position from the second I frame have been read (YES), the control module 22 subtracts the size of one record from the offset in the index file and reads the index file and then the file offset of GOP, in step S9e. The control module 22 thus completes the process of calculating the offset of the next stream data (step S9f).

Figure 10:
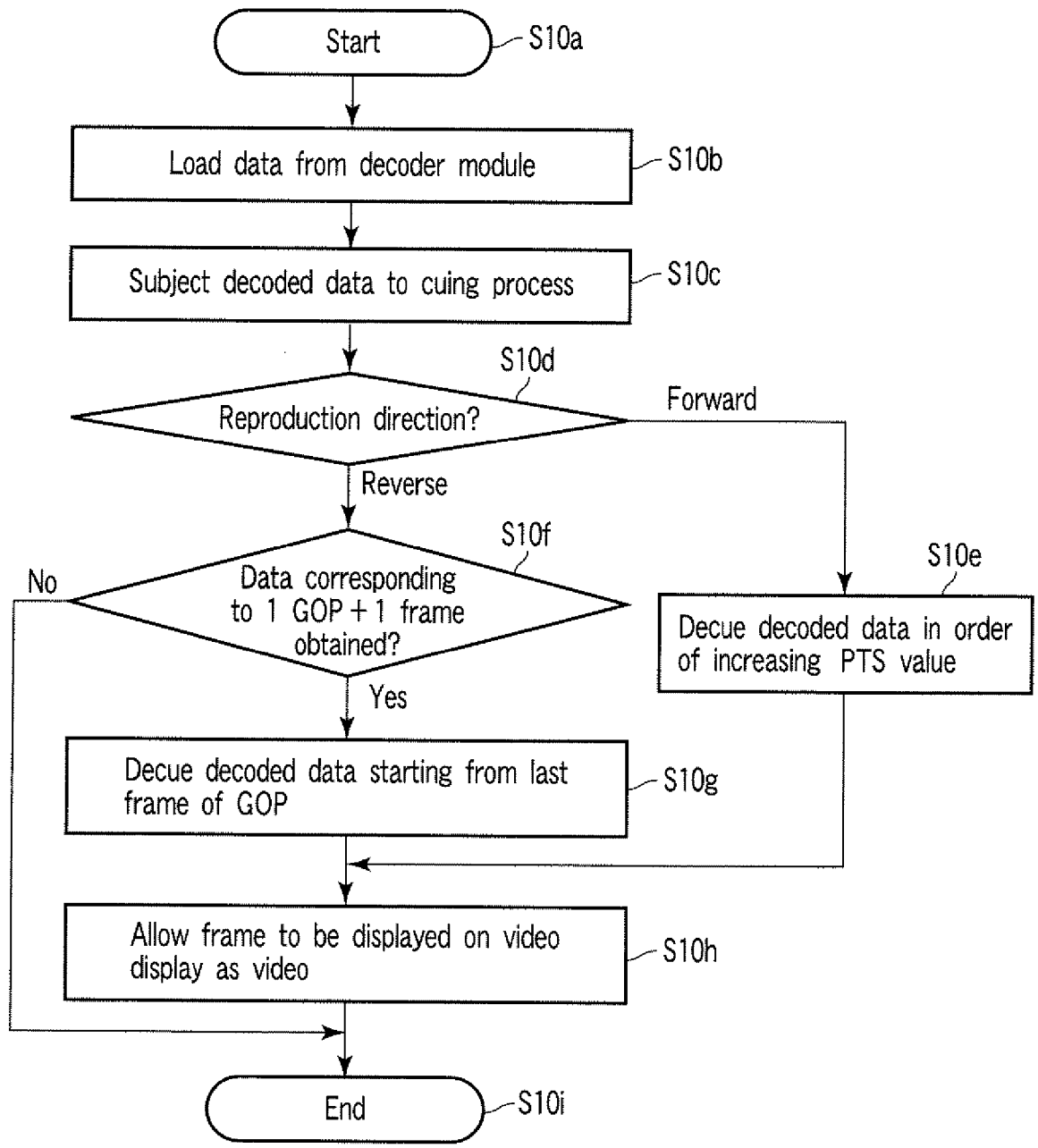
FIG. 10 is a flowchart illustrating a decoded data reproduction process operation performed by the video reproduction apparatus according to the embodiment.

FIG. 10 is a flowchart generally illustrating a decoded data reproduction process operation in step S7e, described above. That is, reproduction of decoded data is requested, and the process is started (step S10a). Then, in step S10b, the control module 22 loads output data from the decoder module 14, and in step S10c, subjects the decoded data to the cuing process.

Subsequently, in step S10d, the control module 22 determines whether the reproduction direction is forward or in reverse. Upon determining that the reproduction direction is forward, the control module 22 decues the decoded data in order of increasing PTS value in step S10e.

Upon determining in step S10d, described above, that the reproduction direction is in reverse, the control module 22 determines in step S10f whether or not data corresponding to one GOP+one frame has been obtained. Then, upon determining that the data has not been obtained (NO), the control module 22 completes the decoded data reproduction process (step S10i). Upon determining that the data has been obtained (YES), the control module 22 decues the decoded data starting from the last frame of GOP, in step S10g.

After step S10e or S10g, described above, the control module 22 outputs the frame data to the video display 18 via the signal processing module 15 and the graphic processing module 16 for video display in step S10h. The control module 22 then completes the decoded data reproduction process (step S10i).

Figure 11:
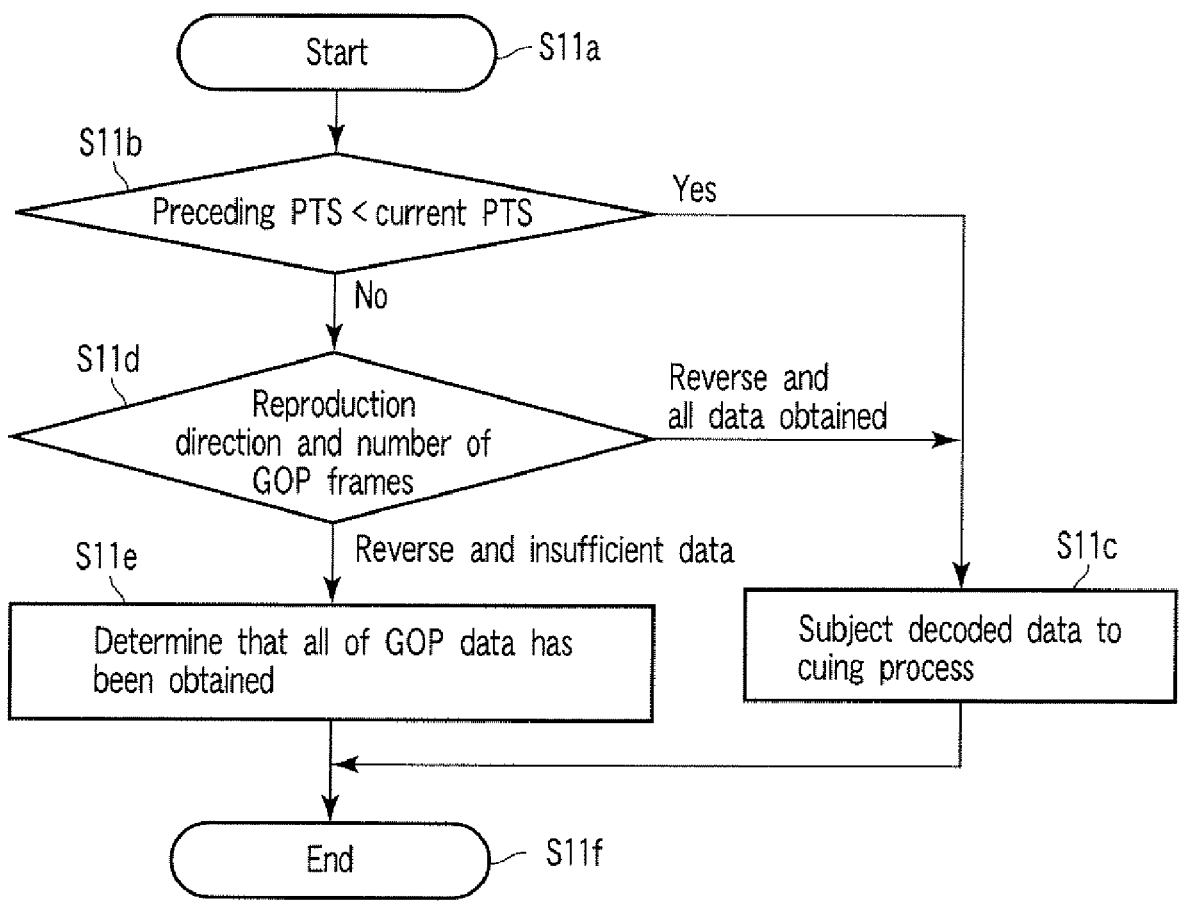
FIG. 11 is a flowchart illustrating a decoded data cuing process operation performed by the video reproduction apparatus according to the embodiment.

FIG. 11 is a flowchart generally illustrating an example of a decoded data cuing process operation in step S10c, described above. That is, a process of cuing the decoded data is requested, and the process is started (step S11a). Then, in step S11b, the control module 22 determines whether the current PTS value is larger than the preceding PTS value.

Upon determining that the current PTS value is larger than the preceding PTS value (YES), the control module 22 executes the process of cuing the decoded data in step S11c. The control module 22 then completes the process of cuing the decoded data (step S11f).

Upon determining that the current PTS value is not larger than the preceding PTS value (NO), the control module 22 determines in step S11d whether or not the reproduction direction and the number of frames in GOP are appropriate. Upon determining that the reproduction direction is in reverse and that the number of frames in GOP is appropriate, the control module 22 is shifted to the processing in step S11c.

Upon determining in step S11d, described above, that the reproduction direction is in reverse and that the number of frames in GOP is insufficient, the control module 22 determines in step S11e that all of the GOP data has been obtained. The control module 22 completes the decoded data cuing process (step S11f).

Figure 12:
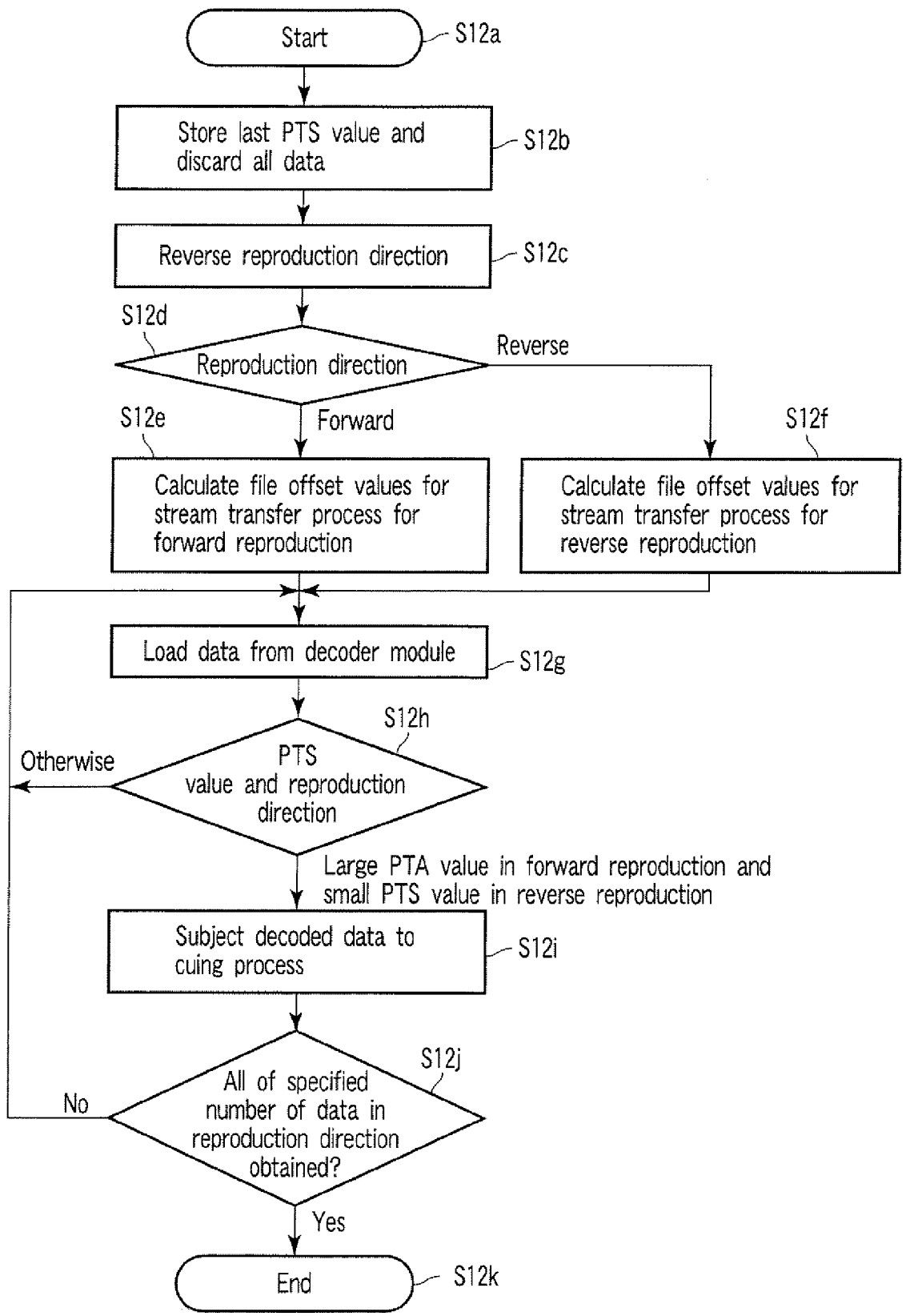
FIG. 12 is a flowchart illustrating a reproduction direction switching process operation performed by the video reproduction apparatus according to the embodiment.

FIG. 12 is a flowchart generally illustrating an example of a reproduction direction switching process operation in step S7f, described above. That is, a reproduction direction switching process is requested, and the process is started (step S12a). Then, in step S12b, the control module 22 stores the last PTS value obtained before the request for the switching of the reproduction direction and then discards all the data.

Subsequently, in step S12c, the control module 22 reverses the reproduction direction, and in step S12d, determines whether the reproduction direction is forward or in reverse. Upon determining that the reproduction direction is forward, the control module 22 calculates file offset values for a stream transfer process for the forward reproduction in step S12e. Upon determining that the reproduction direction is in reverse, the control module 22 calculates the file offset values for the stream transfer process for the reverse reproduction in step S12f.

After step S12e or S12f, described above, the control module 22 loads data from the decoder module 14 in step S12g. Then, in step S12h, the control module 22 determines the PTS value and the reproduction direction.

Upon determining that the PTS value is large when the reproduction direction is forward, whereas the PTS value is small when the reproduction direction is in reverse, the control module 22 subjects the decoded data to the cuing process in step S12i. Upon making a different determination, the control module 22 is shifted to the processing in step S12g.

After step S12i, described above, the control module 22 determines, in step S12j, whether or not a specified number of data in the reproduction direction has been obtained. Upon determining that the number is insufficient (NO), the control module 22 is shifted to the processing in step S12g. Upon determining that the number is appropriate (YES), the control module 22 completes the reproduction direction switching process (step S12k).

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video reproduction apparatus which reproduces stream data recorded on an information recording medium in first video units each comprising a predetermined number of video frames including a video frame subjected to an intra-frame coding process and located at a leading position of the video unit and a plurality of video frames subjected to an inter-frame prediction coding process, the predetermined number of video frames each having time information, the video reproduction apparatus comprising:

a reading module configured to, for each of the first video units, read a management file from the information recording medium, the management file indicating that video frames from the intra-frame coded video frame present at the leading position of the first video unit to an intra-frame coded video frame contained in a succeeding first video unit and inter-frame prediction coded video frames referencing the intra-frame coded video frame contained in the succeeding first video unit are managed as a new second video unit;

a decoder configured to, for each of the second video units indicated by the management file, execute a decoding process on the video frames from the intra-frame coded video frame present at the leading position of the second video unit to the intra-frame coded video frame present at end of the second video unit, in order of increasing time information on the basis of the management file read by the reading module;

a discarding module configured to determine a boundary between the second video units based on a change of each video frame decoded by the decoder from order of increasing time information to order of decreasing time information and discard the intra-frame coded video frame present at the end of the video frame for each of the second video units in which the boundary is determined; and a display module configured to, for each of the second video units in which the intra-frame coded video frame present at the end of the video frame has been discarded by the discarding module, store the video frames in a memory in order of increasing time information and read the video frames from the memory in order of decreasing time information for video display.

2. The video reproduction apparatus of claim 1, wherein the display module is configured to selectively read the video frames from the memory in order of decreasing and increasing time information for video display.

3. The video reproduction apparatus of claim 1, wherein the stream data recorded in the information recording medium is subjected to an efficient compression coding process conforming to MPEG standards.

4. The video reproduction apparatus of claim 3, wherein the video frame subjected to the intra-frame coding process is an I frame, and the video frames subjected to the inter-frame prediction coding process are P frames and B frames.

5. The video reproduction apparatus of claim 4, wherein the first video unit is GOP having one I frame located at a leading position and succeeding and alternately arranged two consecutive B frames and one P frame, and the second video unit is GOP comprising the video frames comprising the first video unit, and one I frame contained in the first video unit succeeding said first video frame and succeeding two B frames.

6. A video reproduction method of reproduction stream data recorded on an information recording medium in first video units each comprising a predetermined number of video frames including a video frame subjected to an intra-frame coding process and located at a leading position of the video unit and a plurality of video frames subjected to an inter-frame prediction coding process, the predetermined number of video frames each having time information, the video reproduction method comprising:

for each of the first video units, reading a management file from the information recording medium, the management file indicating that video frames from the intra-frame coded video frame present at the leading position of the first video unit to an intra-frame coded video frame contained in a succeeding first video unit and inter-frame prediction coded video frames referencing the intra-frame coded video frame contained in the succeeding first video unit are managed as a new second video unit;

for each of the second video units indicated by the management file, carrying out a decoding process on the video frames from the intra-frame coded video frame present at the leading position of the second video unit to the intra-frame coded video frame present at end of the second video unit, in order of increasing time information on the basis of the management file;

determining a boundary between the second video units based on a change of each video frame decoded by the decoding process from order of increasing time information to order of decreasing time information and discarding the intra-frame coded video frame present at the end of the video frame for each of the second video units in which the boundary is determined; and for each of the second video units in which the intra-frame coded video frame present at the end of the video frame has been discarded, storing the video frames in a memory in order of increasing time information and reading the video frames from the memory in order of decreasing time information for video display.

7. The video reproduction method of claim 6, wherein reading the video frames from the memory for video display comprises selectively reading the video frames from the memory in order of decreasing and increasing time information for video display.

8. A video reproduction process program allowing a computer to execute a process of reproduction stream data recorded on an information recording medium in first video units each comprising a predetermined number of video frames including a video frame subjected to an intra-frame coding process and located at a leading position of the video unit and a plurality of video frames subjected to an inter-frame prediction coding process, the predetermined number of video frames each having time information, the video reproduction process program comprising:

a reading module configured to, for each of the first video units, allow the computer to read a management file from the information recording medium, the management file indicating that video frames from the intra-frame coded video frame present at the leading position of the first video unit to an intra-frame coded video frame contained in a succeeding first video unit and inter-frame prediction coded video frames referencing the intra-frame coded video frame contained in the succeeding first video unit are managed as a new second video unit;

a decoder configured to, for each of the second video units indicated by the management file, allow the computer to execute a decoding process on the video frames from the intra-frame coded video frame present at the leading position of the second video unit to the intra-frame coded video frame present at end of the second video unit, in order of increasing time information on the basis of the management file read by the reading module;

a discarding module configured to allow the computer to determine a boundary between the second video units based on a change of each video frame decoded by the decoder from order of increasing time information to order of decreasing time information and allow the computer to execute a process of discarding the intra-frame coded video frame present at the end of the video frame for each of the second video units in which the boundary is determined; and a display module configured to, for each of the second video units in which the intra-frame coded video frame present at the end of the video frame has been discarded by the discarding module, allow the computer to store the video frames in a memory in order of increasing time information and allow the computer to read the video frames from the memory in order of decreasing time information for video display.

9. The video reproduction process program of claim 8, wherein the display module is configured to allow the computer to selectively read the video frames from the memory in order of decreasing and increasing time information for video display.

* * * * *